United States Patent
Chappell

(10) Patent No.: US 9,351,359 B2
(45) Date of Patent: May 24, 2016

(54) INDUCTIVE POWER TRANSFER SYSTEM

(71) Applicant: ALEXSAVA HOLDINGS LIMITED, St Peter Port, Guernsey (GB)

(72) Inventor: Mark Chappell, Derby (GB)

(73) Assignees: ALEXSAVA HOLDINGS LIMITED, St. Peter Port, Guernsey (GB); Mark Chappell, Derby Derbyshire (GB)

(*) Notice: Subject to any disclaimer, the term of this patent is extended or adjusted under 35 U.S.C. 154(b) by 0 days.

(21) Appl. No.: 14/651,514

(22) PCT Filed: Dec. 13, 2013

(86) PCT No.: PCT/GB2013/053299
§ 371 (c)(1),
(2) Date: Jun. 11, 2015

(87) PCT Pub. No.: WO2014/091250
PCT Pub. Date: Jun. 19, 2014

(65) Prior Publication Data
US 2015/0312985 A1    Oct. 29, 2015

(30) Foreign Application Priority Data

Dec. 14, 2012 (GB) ................... 1222624.7

(51) Int. Cl.
| | |
|---|---|
| *H05B 37/02* | (2006.01) |
| *H05B 33/08* | (2006.01) |
| *H02J 5/00* | (2016.01) |
| *H02J 17/00* | (2006.01) |
| *H02J 7/02* | (2016.01) |

(52) U.S. Cl.
CPC ............ *H05B 33/0815* (2013.01); *H02J 5/005* (2013.01); *H02J 7/025* (2013.01); *H02J 17/00* (2013.01); *H05B 33/0845* (2013.01); *H05B 33/0857* (2013.01); *H05B 37/0272* (2013.01)

(58) Field of Classification Search
CPC ................................ H05B 33/08; H05B 37/02
USPC .......... 315/200 R, 209 R, 224, 274, 276, 287, 315/291, 294, 297, 307
See application file for complete search history.

(56) References Cited

U.S. PATENT DOCUMENTS

| | | | |
|---|---|---|---|
| 2008/0084167 A1* | 4/2008 | Waffenschmidt | H02M 3/337 315/210 |
| 2010/0066176 A1 | 3/2010 | Azancot et al. | |

(Continued)

FOREIGN PATENT DOCUMENTS

| | | |
|---|---|---|
| EP | 2302760 A2 | 3/2011 |
| JP | 2002-251901 A | 9/2002 |

(Continued)

OTHER PUBLICATIONS

International Search Report for PCT/GB2013/053299, ISA/EP, Rijswijk, NL, mailed Feb. 26, 2015.

*Primary Examiner* — Tung X Le
(74) *Attorney, Agent, or Firm* — Harness, Dickey & Pierce, P.L.C.

(57) ABSTRACT

An inductive power transfer system comprises a primary side unit (1) and a secondary side unit (6) with a non-conductive barrier (5) therebetween, the primary side unit having a power supply (2), a transmission coil (4) and a controller (12). The secondary side unit has a receiver coil (7), a controller (8) and a load (9). The secondary side controller (8) is configured to detect the voltage in the receiver coil (7) and to transmit to the primary side controller (12) a control signal requesting an increase or decrease in the power transmitted from the primary side according to whether the voltage in the receiver coil (7) is above or below a predetermined value.

9 Claims, 6 Drawing Sheets

(56) References Cited

U.S. PATENT DOCUMENTS

| | | | |
|---|---|---|---|
| 2011/0115412 A1* | 5/2011 | Welten | H05B 33/0815 315/307 |
| 2011/0261931 A1 | 10/2011 | Zimpfer et al. | |
| 2011/0266969 A1* | 11/2011 | Ludorf | H02M 1/4258 315/294 |
| 2012/0206054 A1* | 8/2012 | Kim | H05B 33/0815 315/185 R |
| 2014/0253032 A1* | 9/2014 | Bruwer | H02M 3/33507 320/108 |

FOREIGN PATENT DOCUMENTS

| | | |
|---|---|---|
| WO | WO-2007/020583 A2 | 2/2007 |
| WO | WO-2008/012702 A1 | 1/2008 |
| WO | WO-2010080737 A1 | 7/2010 |
| WO | WO-2011/036343 A1 | 3/2011 |

* cited by examiner

INDUCTIVE POWER TRANSFER SYSTEM

CROSS-REFERENCE TO RELATED APPLICATIONS

This application is a 371 U.S. National Stage of International Application No. PCT/GB2013/053299, filed on Dec. 13, 2013, and published in English as WO 2014/091250 A2 on Jun. 19, 2014, which claims the benefit of and priority to British Patent Application No. 1222624.7, filed on Dec. 14, 2012. The disclosures of the above applications are incorporated herein by reference.

FIELD OF THE INVENTION

This invention relates to an inductive power transfer system, for transferring electrical power where conventional connections are impossible, for example for providing lighting on the exterior of the hull of a boat or for coupling power between a rotating component and a stationary component.

BACKGROUND TO THE INVENTION

There are many applications where it is desirable to transfer power without a physical connection between the power supply and the power load.

For example, for rotating machinery, power connections between the rotating parts and the stationary parts are typically made using slip rings. However, these are subject to wear and thus have maintenance requirements. There is therefore a need to be able to provide a contactless power transfer system.

There are also applications where a physical barrier exists to the passage of cables. For example, providing underwater lighting on the external surface of a boat hull, or within a tank, is desirably carried out without passing electricity supply cables through the hull or tank, since the integrity of the hull or tank needs to be maintained. Running external cables down the side of the hull is visually unacceptable, so it has been proposed to supply power inductively through the hull to externally mounted lights. However, power transmission depends very much on the thickness and materials of the hull, and so each installation has to be specifically designed for the particular boat and position of the light on the boat. Additionally, control of the external lights, for example to vary brightness, is difficult.

JP2002251901 discloses an underwater lighting system for which power is supplied inductively.

WO2010080737 discloses a RFID communication system which is configured to handle variations in the delivery of power to a remote device resulting from relative movement of the remote device and the inductive power supply. In one embodiment the remote device toggles between load configurations to communicate with the inductive power supply. A sensor in the remote device detects a characteristic of power in the remote device and configures the communication load based on the sensor output. In another embodiment, the remote device adjusts the dynamic communication load configuration in the remote device in response to a failure to receive a response from the inductive power supply.

WO2011036343 discloses a method of wirelessly powering a load over an inductive link, in which data is transmitted relating to the output voltage and/or current from a secondary side to a primary side through an inductive power link to regulate the output of an inductive power supply.

SUMMARY OF THE INVENTION

Accordingly, the invention provides an inductive power transfer system, comprising a primary side unit and a secondary side unit, the primary side unit having a switched mode power supply (SMPS), a transmission coil and a controller, and the secondary side unit having a receiver coil, a controller and a load, wherein the secondary side controller is configured to detect the voltage in the receiver coil and to transmit to the primary side controller a control signal requesting an increase or decrease in the power transmitted from the primary side according to whether the voltage in the receiver coil is above or below a predetermined value, and wherein the primary side controller is configured to set the initial operating frequency of the SMPS, on start-up, by a) Setting the operating frequency to a maximum value and gradually reducing the frequency until a control signal is received from the secondary side unit;
b) Setting the secondary load to zero and determining the secondary voltage;
c) Determining the operating frequency required to achieve the desired voltage in the secondary unit under a predetermined load; and
d) Configuring the control loop speed according to the operating frequency so determined.

Preferably, the primary unit is configured to increase or decrease the power transmitted by increasing or decreasing the SMPS operating frequency in the transmission coil in response to said request.

The secondary side controller is preferably configured to control the supply of power selectively to a plurality of loads according to control signals transmitted from the primary side controller.

Pulse width modulation may be used to control the power to the or each load.

The or each load may be a light, suitably a LED light, and a plurality of LED lights of different colour output may be used, the lights being selectively controllable to provide a continuously-variable colour output from the secondary side unit.

The primary side and secondary side controllers may be configured to communicate with each other using radiofrequency (RF) messaging, for example at 835 MHz or 2.4 GHz.

It will be appreciated that the start-up refers to a static position after installation, for example on a boat hull or the like. Since each installation might be different, in particular with a different distance between the primary and secondary units, and/or with different material between them, the system of the invention can readily adapt itself to ensure maximum performance for its particular installation.

In an alternative embodiment, the primary side and secondary side are arranged with one side on a rotating body and the other side on a static body.

BRIEF DESCRIPTION OF THE DRAWINGS

In the drawings, which illustrate exemplary embodiments of the invention.

DETAILED DESCRIPTION OF THE ILLUSTRATED EMBODIMENT

Figure 1:
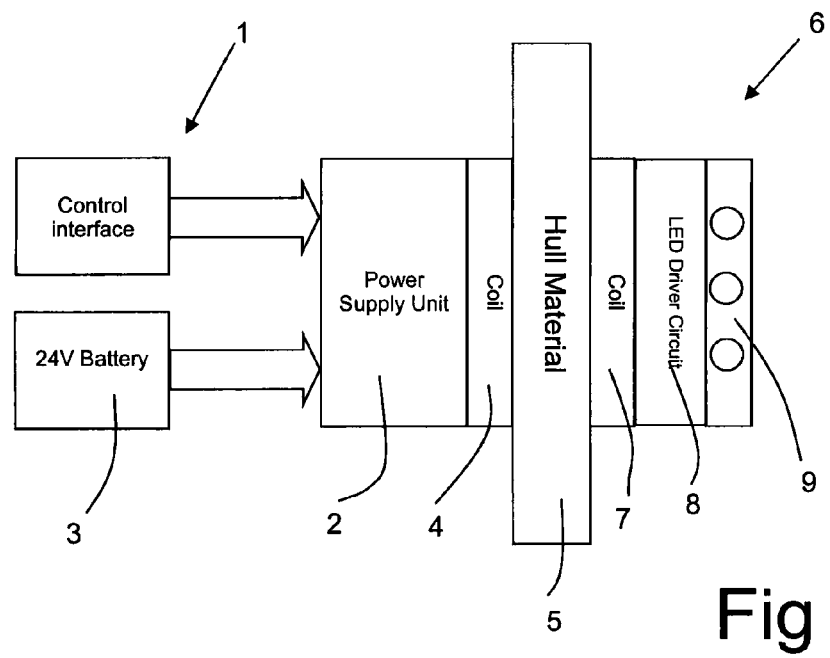
FIG. 1 is a general block diagram of an external lighting system for boat hulls.

FIGS. 1 to 4 of the drawings illustrate an external lighting system for boats of the type having a non-conductive hull of, for example, 10 mm to 25 mm in thickness. Referring first to FIG. 1, the primary side 1 within the hull comprises a switched mode power supply (SMPS) 2 provided with power from the boat's supply, for example a 24V battery 3. A control interface within the boat controls operation of the device, and a transmitting coil 4 is mounted against the inside of the hull at the desired location. The secondary side 6 comprises a receiver coil 7 mounted in contact with the hull 5, an LED driver circuit 8 and a set of LEDs 9 of different coloured light output.

Figure 2:
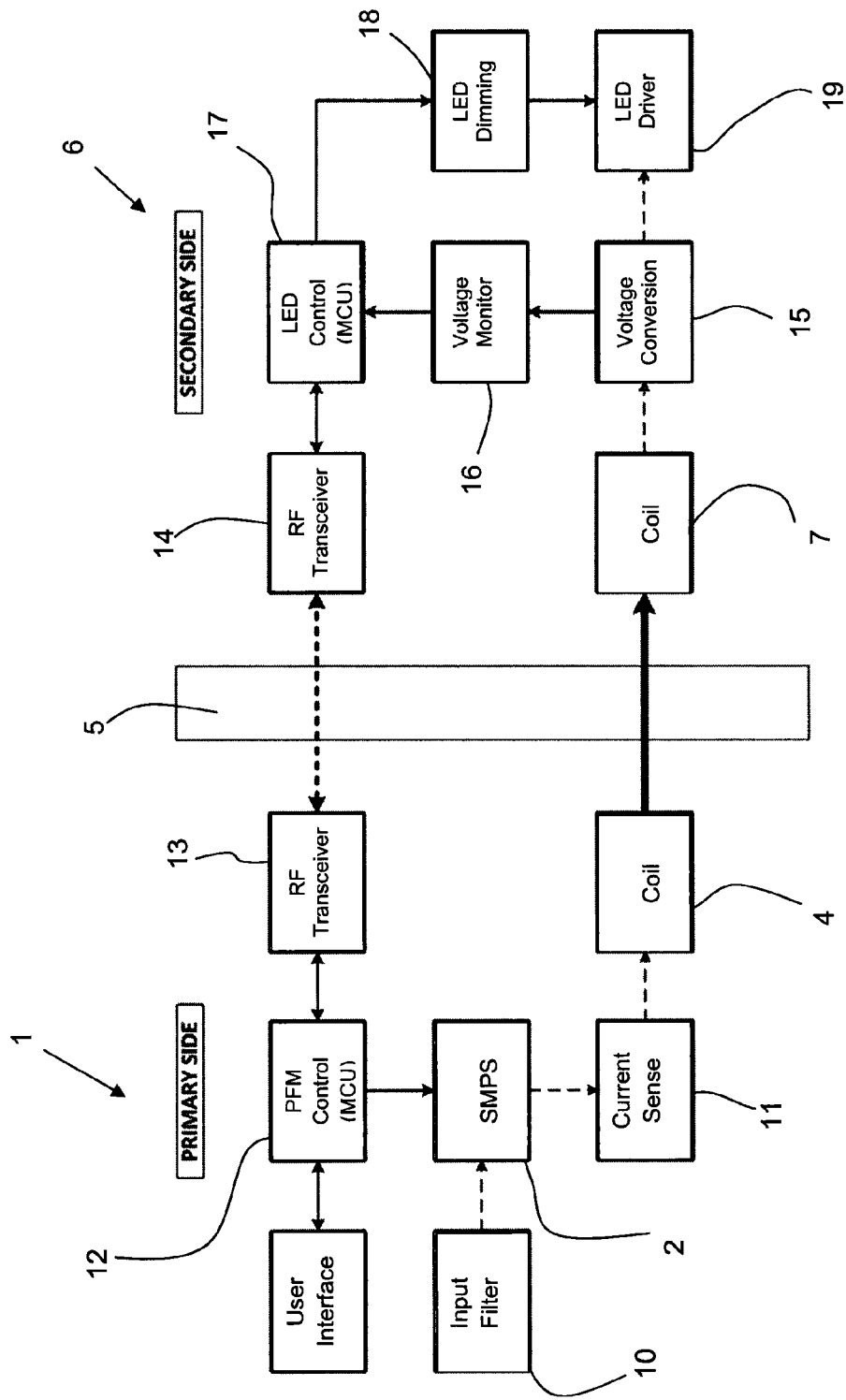
FIG. 2 is a more detailed block diagram of the system of FIG. 1.
Figure 3:
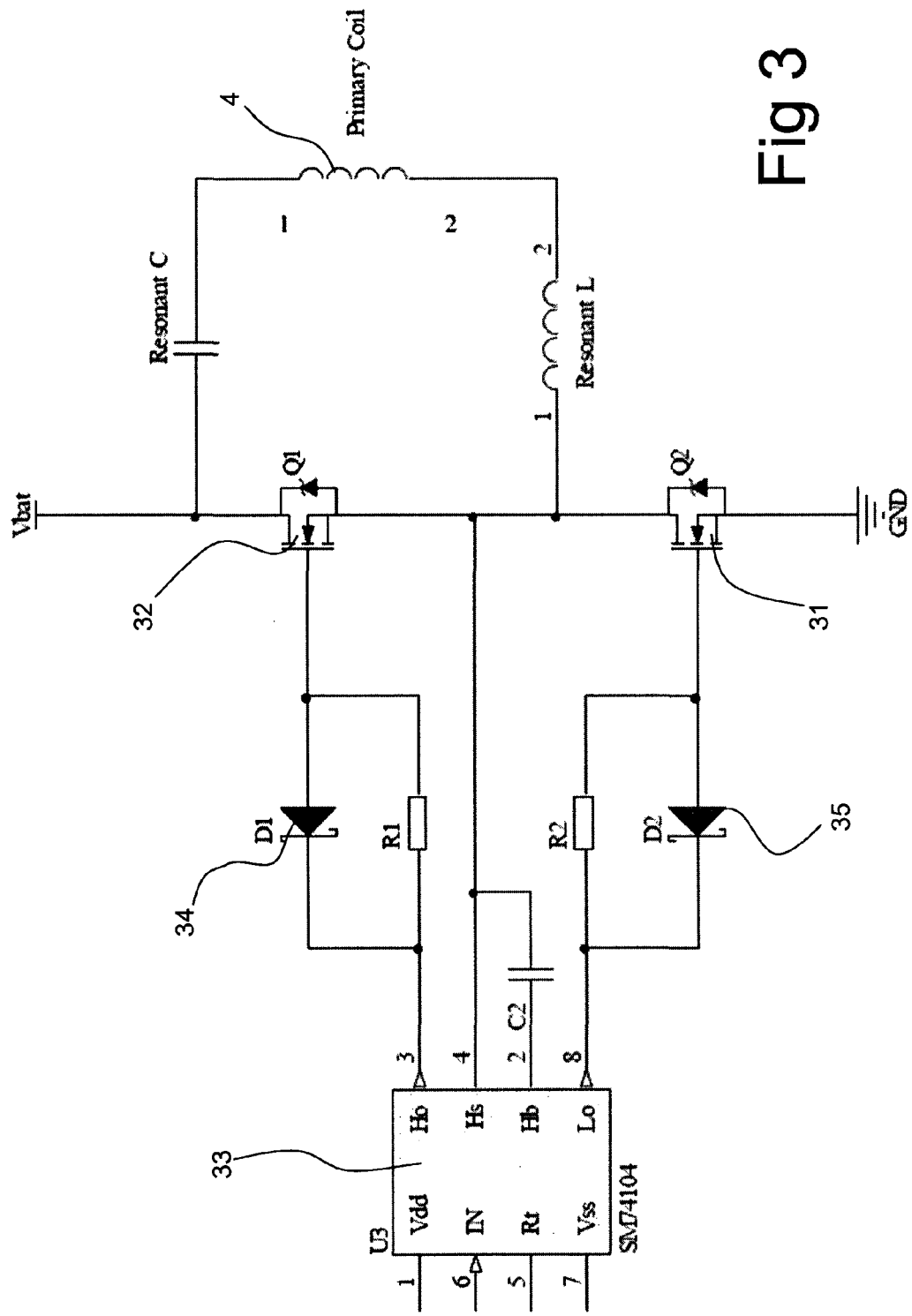
FIG. 3 is a circuit diagram illustrating the operation of the power supply in the system of FIGS. 1 and 2.
Figure 4:
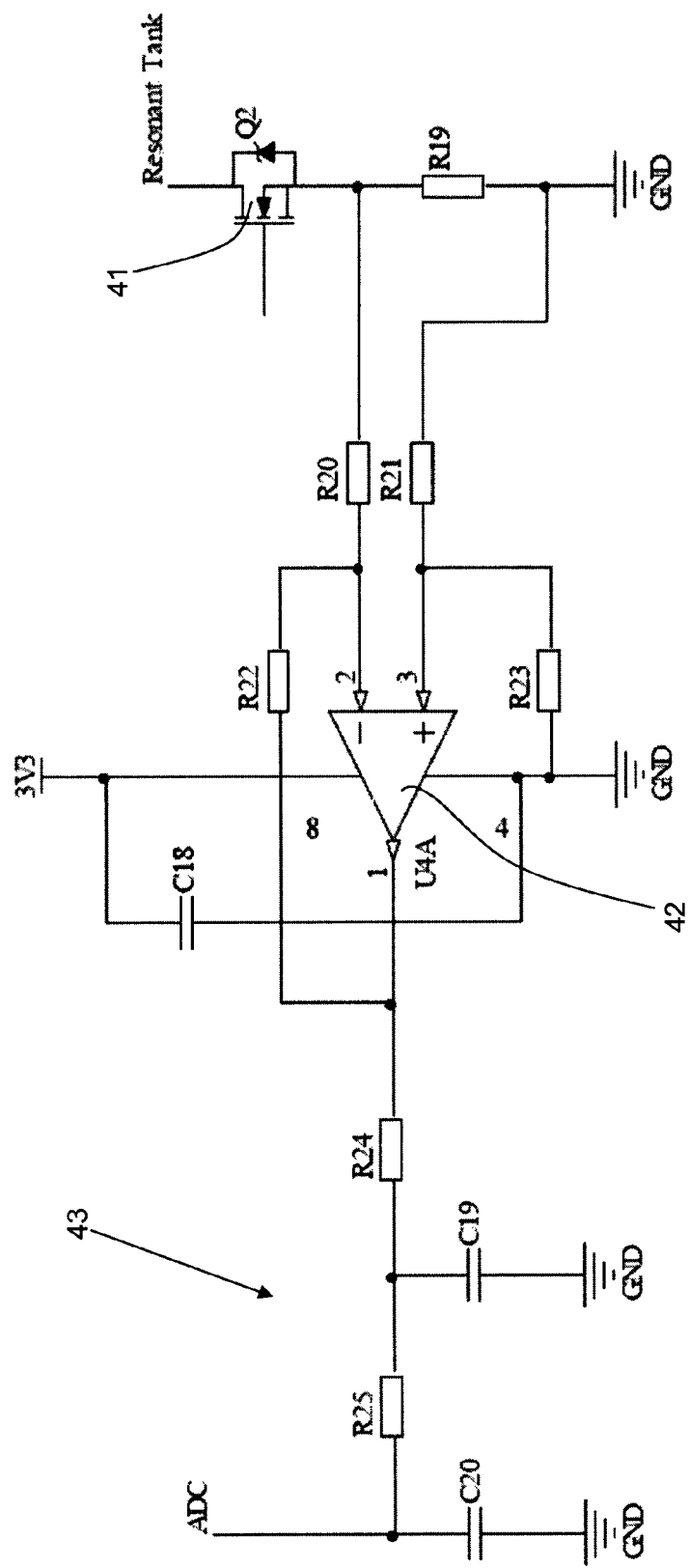
FIG. 4 is a circuit diagram illustrating the current sense circuit in the primary side of the system of FIGS. 1 to 3.

FIG. 2 shows the system in more detail. On the primary side, the SMPS 2, illustrated in more detail with reference to FIG. 3, uses a series LC resonant converter to transmit power from the primary to the secondary circuits. The use of a series capacitor 30 eliminates the requirement to place capacitor banks across each switch. MOSFETS 31 and 32 are driven using a Texas Instruments SM74104 chip 33. The driver is controlled using 3.3V logic. Reverse diodes 34 and 35 are used on both gate drives to facilitate rapid MOSFET turn off, reducing thermal stress and increasing mean time between failures.

The SMPS 2 is supplied with power via an input filter 10 whose function is to ensure compliance with conducted emissions standards and to prevent excessive inrush current during converter start-up. It will also serve to limit supply rail transient surges. The output of the SMPS passes through a current sense circuit 11, illustrated in more detail in FIG. 4, which is arranged to detect high primary side current conditions. Current sensing is performed using a series resistor 40 connected between ground and the low side source of a MOSFET 41. To ensure that the sense resistor cannot be bypassed, the half bridge resonant path is connected to the supply rail rather than to 0V. The voltage developed across the current sense resistor 40 is buffered using a unity gain op-amp 42 and then passed through a low pass filter 43 before connection to the pulse frequency modulation control 12.

The pulse frequency modulation control 12 comprises a Texas Instruments MSP430 MCU, which runs from a 16 MHz internal clock and functions as both the SMPS controller and the RF transceiver interface for the primary side RF transceiver 13. This and the secondary side transceiver 14 operate at 2.4 GHz and employ a three-byte messaging system. In the secondary to primary RF message the first byte represents the temperature in degrees Celsius, and the remaining two bytes contain the output voltage in millivolts. The RF message is sent periodically using a tick timer running from the MCU internal clock. The RF message from primary to secondary consists of three bytes in the format of red, green and blue. This byte value corresponds to LED brightness, permitting 256 steps. The primary transmits the RGB message in response to receiving a message from the secondary. The two units are coded to pair together.

The secondary side LED driver circuit 8 comprises a voltage conversion circuit 15, as the AC voltage present on the secondary coil 7 must be rectified to DC to run the LED drivers. The AC waveform is passed through a series resonant capacitor and then rectified using a Schottky bridge, for example. The DCV output voltage is monitored as part of the control loop by a Voltage Monitor 16 is measured using the ADC (analogue to digital converter) of the secondary MCU 17, which is suitably a Texas Instruments MSP430. This has an internal sensor which provides temperature monitoring.

The LED Dimming control 18 uses XP power LDU0830S350 constant current buck regulators, which produce 350 mA and require 2V of headroom to operate. The LED brightness is controlled using a 1.25V PWM signal produced from a potential divider connected to the 3.3V output of the MCU. The LEDs are configured in series strings of three diodes. Each colour channel has a separate LED driver 19. When turned on, the brightness range of each LED string is fully adjustable from 25% to 100%.

In use, the output voltage on the secondary unit will vary with input voltage, temperature and load requirements. A closed loop control therefore compensates for these variables. Closed loop feedback is only used once an RF link has been established between the primary and secondary units. The output voltage is monitored using the secondary MCU ADC. The ADC reading is converted into millivolts and periodically transmitted to the primary MCU over the RF link. The primary responds to voltage drift by reducing the operating frequency when output voltage is low and increasing the operating frequency when output voltage is high. The frequency step change uses a non-linear algorithm based on output voltage delta. It will be seen, therefore, that the system can automatically adjust for different thicknesses of non-conductive hull between the two units, and thus the system can be used on a wide range of vessels without physical adaptation.

The secondary MCU 17 is used to control LED brightness and fade times. The MCU will only permit load changes when the output voltage is within an acceptable tolerance window. This transient load limiting is not reliant upon the RF link and thus can respond quickly to voltage overunder shoot. The load transition is effectively paused until the primary control loop can catch up and respond to the output voltage shift.

The temperature monitoring function of the secondary MCU 17 can be used in two ways to avoid excessive temperatures developing: the LED output power can be reduced, or the unit can be turned off until temperature returns to acceptable levels.

Figure 5:
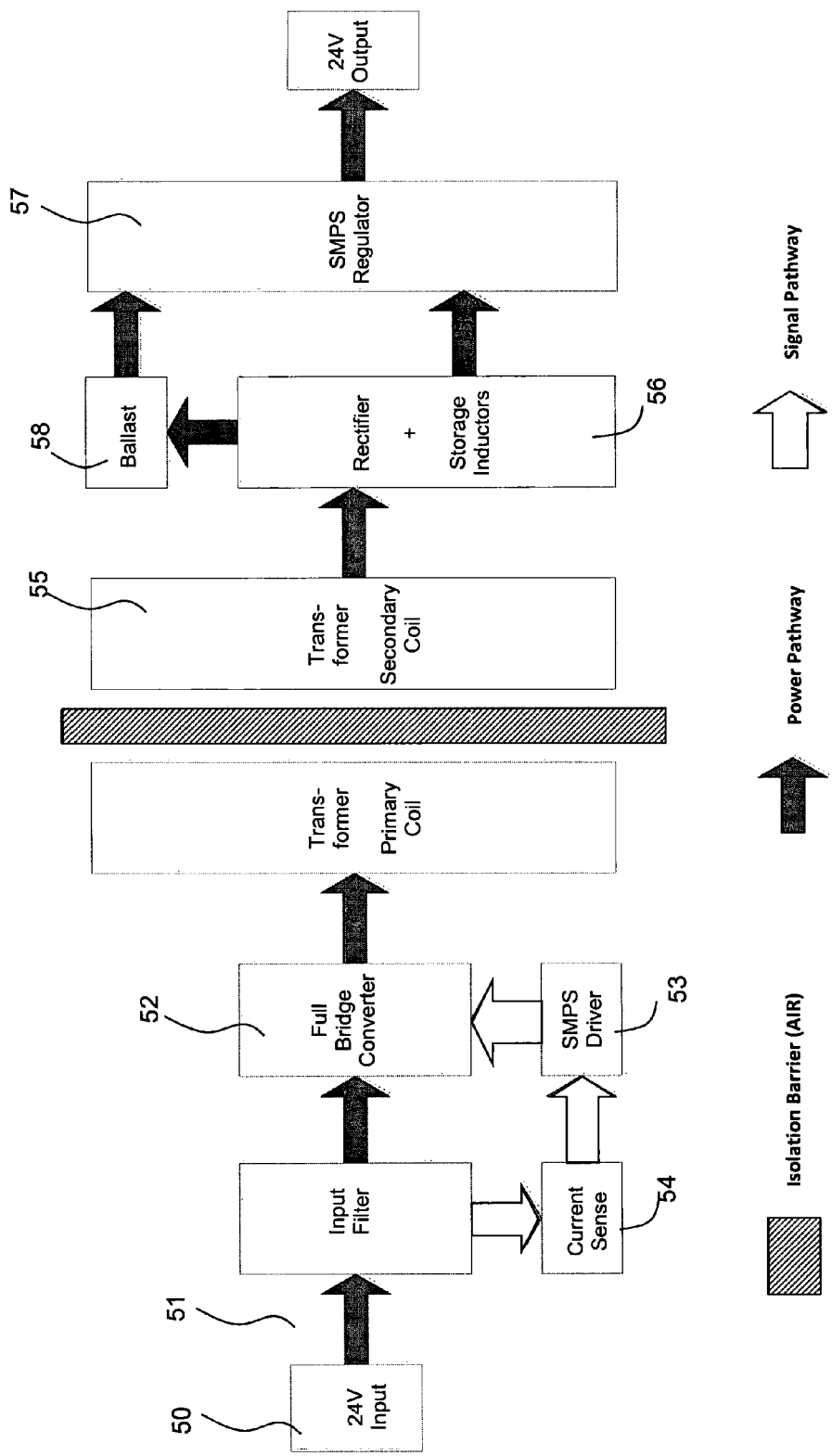
FIG. 5 is a general block diagram of a slip ring replacement power transfer system.

Referring now to FIG. 5, the system illustrated is a contactless, switch mode power supply (SMPS) intended to function as a slip ring replacement. The contactless system avoids the need for brushes to transfer power, and thus the need for maintenance of the brushes as they wear. In the illustrated example, the power supply 50 is a 24V DC supply connected to an input filter 51, for example a standard CLC pi filter with a common choke in the input, whose primary purpose is to prevent supply rail spikes for damaging the switch mode power supply. The filter is designed to limit excessive inrush current. A resistive divider can be used to produce an under-voltage lock-out signal.

The output of the filter 51 passed to a full bridge converter 52, consisting for example of 4 N-channel MOSFET devices. A switch mode power supply (SMPS) driver 53 is a self-oscillating full bridge driver capable of operation up to the specified maximum switching frequency, in this case 150 kHz.

Integrated bootstraps are used to drive the high side MOSFETs. The control chip offers both UVLO and SC protection. Frequency selection is performed using an external RC time constant. The selected control chip is capable of running in an open loop configuration. A current sense circuit 54 is used for both overload and short circuit protection. It is implemented by using a sense resistor on the positive supply rail. Resistive power loss is reduced by the implementation of a dedicated current monitoring amplifier. Thus a large signal can be produced using a low value sense resistor.

The transformer 55 is based on a segmented pot core. This design provides a high AL value and thus the number of required turns is reduced. The reduction in primary turns is essential due to the conduction losses associated with long winding paths. The output of the secondary coil in the rotary transformer 55 is connected to a rectifier 56, described hereinafter with reference to FIG. 6. The rectifier output is passed to a SMPS output regulator 57. A ballast circuit 58 is required because the open loop converter will exhibit excessive output voltage during zero load operation. This could be resolved in one of two ways. The first is to use a simple zener clamp to prevent the voltage from exceeding the maximum supply voltage of the regulator. The zener clamp will cause the output voltage to fall once conduction begins. This can be difficult to predict and will require a zener rated for several watts. The second method is to use a ballast resistor to ensure that the circuit always has a minimum load. While both systems will dissipate power, the ballast resistor can do so without compromising MTBF. It is desirable to implement both systems, with the zener only being used to deal with voltage spikes rather than steady state operation.

A SMPS output regulator 57 is required due to the open loop nature of the system. A simple linear regulator is one option. Unfortunately the linear regulator is not ideal for running across a wide supply range and displays extremely poor efficiency when running from high supply rails. Therefore a switch mode regulator is used. This offers three key advantages over a linear regulator.

Wide supply rail range (9-36V)
High efficiency, up to 85%
Quiescent current at zero load.

The fact that a switch mode regulator has a quiescent current may not seem to be an advantage, but it reduces or perhaps removes the ballast resistor requirements.

Figure 6:
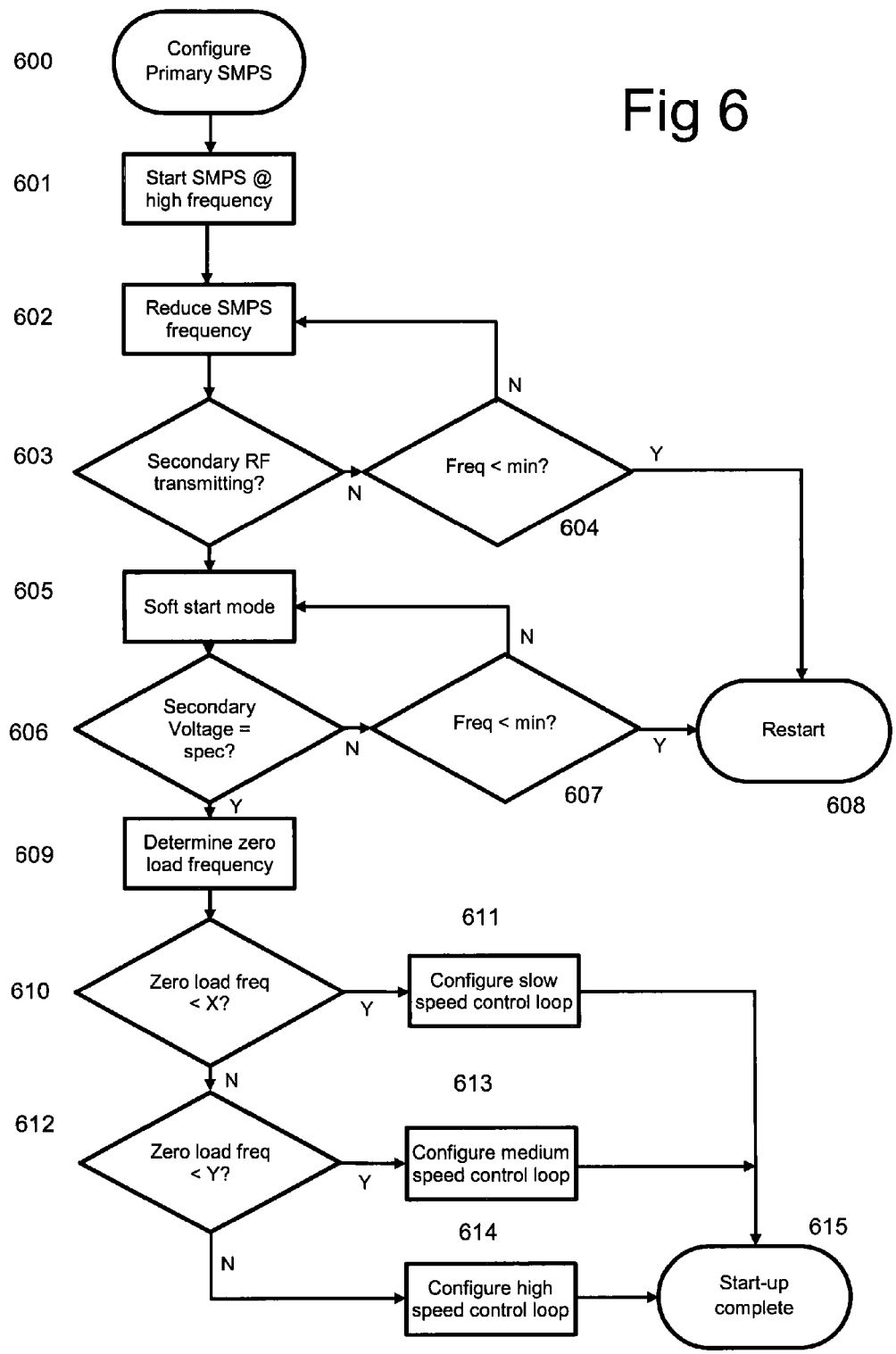
FIG. 6 is a flowchart illustrating the start-up procedure for the system.

FIG. 6 illustrates the typical start-up procedure for the SMPS, enabling it to adjust for the actual spacing between the primary and secondary units. Because the apparatus of the invention is intended to be usable with any of a range of different distances between them, the SMPS is configured to run a configuration procedure during start-up, the starting point for which in the diagram is represented at 600. The starting frequency (Step 601) will depend upon the configuration of the unit, but will typically be between 40 kHz and 100 kHz and will equate to the lowest output voltage. The frequency is then reduced (Step 602) and receipt of RF from the secondary unit is then checked (603). If no RF is received, the frequency is compared (604) with a predetermined minimum frequency, which again will depend on the configuration of the unit, but will typically be between 10 kHz and 30 kHz, and will equate to the maximum output voltage. If the frequency is already at the minimum value, the system must restart (608), otherwise it is stepped down again (602) and the test loop repeated.

When RF from the secondary is detected at 603, the system enters soft start mode (605), in which the primary unit transmits a command signal to the secondary unit to switch the secondary load to zero, or to a predetermined value. The secondary voltage measurement is transmitted as part of the RF signal, and if this is not at the design value for the secondary load (606), the frequency is compared with the system minimum frequency at 607. If it is less than the minimum, a restart is required (608), otherwise the soft start mode is recommenced (605). If the secondary voltage is at the design value (or within the design margin around it), the zero load frequency is then determined at 609. If the frequency is below (610) a first value X (which might equal 20 kHz), the slow speed control loop is configured (611) and start-up is complete (615). If the frequency is equal to or above X, but less than Y (which might equal 30 kHz), the medium speed control loop (613) is configured, again completing start-up. If the frequency is equal to or above Y, the high speed control loop (614) is configured to complete start-up.

Figure 7:
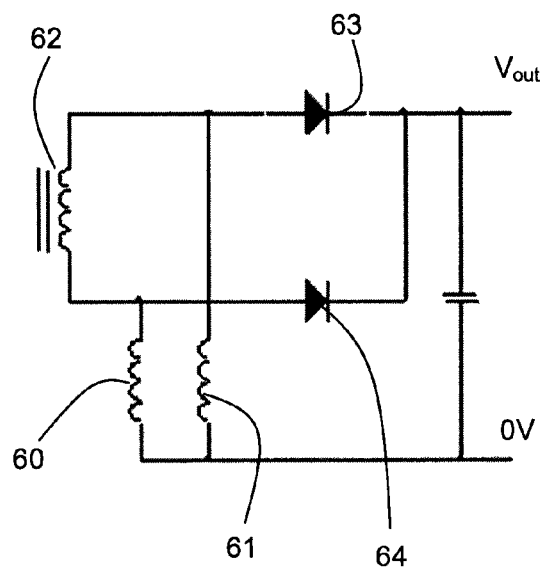
FIG. 7 is a circuit diagram of the rectifier circuit in the system of FIG. 5.

Referring now to FIG. 7, a standard full bridge converter features a centre tapped secondary winding, and this poses two problems. First is the loss of winding area due to having two secondary windings. Second is the inefficient use of copper caused by only having half of the winding conducting at any one point in time. Both of these issues can be resolved by using a current doubling rectifier as illustrated in FIG. 7. The current doubler requires two storage inductors 60 and 61, connected between ground and the inputs to the diodes 63 and 64 respectively. Having a single winding 62 permits the use of larger wire gauges and thus reduces the DC resistance of the transformer secondary (lower conduction losses).

The system illustrated in FIGS. 5 to 7 is suitable for low power operation, for example being scalable up to about 1 kW. However, the invention is applicable to high power systems as well.

The invention claimed is:

1. An inductive power transfer system, comprising a primary side unit and a secondary side unit, the primary side unit having a switched mode power supply (SMPS), a transmission coil and a controller, and the secondary side unit having a receiver coil, a controller and a load, wherein the secondary side controller is configured to detect the voltage in the receiver coil and to transmit to the primary side controller a control signal requesting an increase or decrease in the power transmitted from the primary side according to whether the voltage in the receiver coil is above or below a predetermined value, and wherein the primary side controller is configured to set an initial operating frequency of the SMPS, on start-up, by
  a) setting the operating frequency to a maximum value and gradually reducing the frequency until a control signal is received from the secondary side unit;
  b) setting the secondary load to zero and determining the secondary voltage;
  c) determining the operating frequency required to achieve the desired voltage in the secondary unit under a predetermined load; and
  d) configuring a control loop speed according to the operating frequency determined in step c).

2. The inductive power transfer system according to claim 1, wherein the primary unit is configured to increase or decrease the power transmitted by increasing or decreasing the SMPS operating frequency in the transmission coil in response to said request.

3. The inductive power transfer system according to claim 1, wherein the secondary side controller is configured to control the supply of power selectively to a plurality of loads according to control signals transmitted from the primary side controller.

4. The inductive power transfer system according to claim 1, wherein the secondary side controller is configured to control the power to the or each load by means of pulse width modulation.

5. The inductive power transfer system according to claim 1, wherein the or each load comprises a light.

6. The inductive power transfer system according to claim 5, comprising a plurality of LED lights of different colour output, the lights being selectively controllable to provide a continuously-variable colour output from the secondary side unit.

7. The inductive power transfer system according to claim 1, wherein the primary side and secondary side controllers are configured to communicate with each other using radiofrequency (RF) messaging.

8. The inductive power transfer system according to claim 7, wherein the RF messaging is at 2.4 GHz.

9. The inductive power transfer system according to claim 1, wherein the primary side and secondary side units are mounted so that one side is rotatable relative the other side.

* * * * *